US005103407A

United States Patent [19]

Gabor

[11] Patent Number: 5,103,407

[45] Date of Patent: Apr. 7, 1992

[54] APPARATUS AND METHOD FOR COLOR SELECTION

[75] Inventor: Akiva P. Gabor, Ra'anana, Israel

[73] Assignee: Scitex Corporation, Herzliya, Israel

[21] Appl. No.: 482,435

[22] Filed: Feb. 20, 1990

[30] Foreign Application Priority Data

Feb. 21, 1989 [IL] Israel ........................................ 89359

[51] Int. Cl.[5] ........................................ G06K 1/00

[52] U.S. Cl. ........................................ 395/131; 395/161

[58] Field of Search ........................................ 364/518-521, 364/237.2 MS, 927.3 MS; 340/701-704, 750; 358/75, 80, 1, 10; 346/154, 157

[56] References Cited

U.S. PATENT DOCUMENTS 4,771,275 9/1988 Sanders ........................................ 340/701
4,953,104 8/1990 Yeh et al. ........................................ 346/157

OTHER PUBLICATIONS

"An Experimental Comparison of RGB, YIQ, LAB, HSV and Opponent Color Models" by M. Schwarz et al., ACM Transactions on Graphics, vol. 6, No. 2, Apr. 1987, pp. 123-158.

*Primary Examiner*—Arthur G. Evans
*Attorney, Agent, or Firm*—Townsend and Townsend

[57] ABSTRACT

Apparatus and method for color selection comprising apparatus defining a color display and selection space including a first area in which colors of a range of different hues are displayed at substantially predetermined levels of luminance and saturation and a second area in which colors of a selected hue, selectable from said range of different hues, and of differing saturation and luminance are displayed.

19 Claims, 4 Drawing Sheets

APPARATUS AND METHOD FOR COLOR SELECTION

FIELD OF THE INVENTION

The present invention relates to computerized graphic processing apparatus generally and more particularly to computerized process color editing apparatus and techniques.

BACKGROUND OF THE INVENTION

Computerized process color editing apparatus is known in the art. The first such apparatus was introduced in 1979 by Scitex Corporation of Herzlia, Israel, the assignees of the present invention, under the trade name RESPONSE.

The present state of the art is represented by the Scitex RIGHTOUCH, which permits a user to select from among 16,000,000 colors.

It is clearly impossible to simultaneously display to the operator all 16,000,000 colors. Accordingly various techniques have been proposed for providing sequential interactive color choice functions in such systems.

There is described in "An Experimental Comparison of RGB, YIQ, LAB, HSV and Opponent Color Models" by Micheal W. Schwarz et al, ACM Transactions on Graphics, Vol. 6, No. 2, April, 1987 pp 123–158, a color matching experiment for interactively matching colors.

There is shown in the art various two level color selection methods. The Apple Color Manager, a software program by Apple Inc. designed for the Macintosh II, has disposed a bar with varying luminance and a two-dimensional color circle with varying hue and saturation levels where the luminance, hue and saturation levels only approximate the scientific meaning of the words. The user chooses a color from an image or from a palette of 256 colors and then corrects it by choosing a luminance level from the luminance bar and hue and saturation levels from the color circle. Upon choosing a luminance level from the luminance bar, the system displays, in a position along the luminance bar indicating the amount of luminance chosen, the resultant color as the previously chosen hue and saturation levels at the chosen luminance level. The user then chooses both hue and saturation by indicating a desired position on the color circle. The resultant color is displayed in the image.

SUMMARY OF THE INVENTION

The present invention seeks to provide apparatus and a technique for color selection which is relatively quick and efficient to use.

There is thus provided in accordance with a preferred embodiment of the present invention apparatus for color selection comprising apparatus defining a color display and selection space including a first area in which colors of a range of different hues are displayed at substantially predetermined levels of luminance and saturation and a second area in which colors of a selected hue, selectable from said range of different hues, and of differing saturation and luminance are displayed.

Additionally, in accordance with a preferred embodiment of the invention, in the first area the colors are displayed in at least one one-dimensional grid where one one-dimensional grid is operative to display colors, covering the full available range of hues, at a relatively low resolution and at uniform levels of luminance and saturation.

Further, in accordance with a preferred embodiment of the invention, the first area comprises a plurality of one-dimensional grids including also a one-dimensional grid which displays at relatively high resolution a relatively limited range of hues about a selected hue generally at selected levels of luminance and saturation.

In accordance with a preferred embodiment of the invention, in the second area the colors are displayed in a two-dimensional grid where variations in saturation and luminance are displayed along mutually orthogonal axes.

Further, in accordance with a preferred embodiment of the invention, in the first and second areas, colors are displayed in color blocks where the color of each color block is a central color of a range of colors represented by the color block. The selection location of a color within a color block defines which color of the range of colors is selected.

Still further, in accordance with a preferred embodiment of the invention, the color selection apparatus comprises apparatus for selection of a pair of colors, a first color constituting a constant reference for a second selectable color displayed in the first and second areas.

According to a preferred embodiment of the invention, the color selection apparatus also comprises areas for the display of the reference color and a selected color, where the reference color is selected from an image on the screen and the selected color is the color to replace the reference color.

Further in accordance with an embodiment of the invention there is provided apparatus for selection of a pair of colors, one being the neighbor or background of the other and comprising apparatus defining a color display and selection space including a first area in which colors of a range of different hues are displayed and a second area in which colors of a given hue, selectable from said range of different hues, and of differing saturation and luminance are displayed.

Additionally in accordance with a preferred embodiment of the present invention there is provided a color selection method comprising the steps of:

defining a color display and selection space including a first area in which colors of a range of different hues are displayed and a second area in which colors of a selected hue, selectable from the range of different hues, and of differing luminance and saturation are displayed, iterating in any order of the following mutually independent operations: a) for given luminance and saturation levels, selecting a given hue from the first area and b) for a given hue, selecting a color of given luminance and saturation from the second area.

Further in accordance with an embodiment of the invention, following the selection of the luminance and saturation levels, the selected hue and hues close to it on the hue bar are displayed at the selected luminance and saturation levels.

Additionally in accordance with a preferred embodiment of the present invention there is provided a method for selection of two associated colors comprising the steps of defining a color display and selection space including a first area in which first colors of a range of different hues are displayed against the background of a second reference color and a second area in which first colors of a given hue, selectable from the range of different hues and of differing luminance and saturation are displayed against the background of the second reference color, selecting a reference color, varying the first color iteratively in any order of the following mutually independent operations; a) for given luminance and saturation levels, selecting a given hue from the first area and b) for a given hue, selecting a color of given luminance and saturation from the second area. In addition, the first and second colors can be interchanged.

BRIEF DESCRIPTION OF THE DRAWINGS

The present invention will be understood and appreciated more fully from the following detailed description, taken in conjunction with the drawings in which:

FIG. 4 is a pictorial illustration of the changes to an image as a result of the color selection and correction process of the present invention.

DETAILED DESCRIPTION OF THE INVENTION

The present invention will be described hereinbelow in the context of a commercially available existing process color graphics editor, the Scitex SoftProof System, available from Scitex Corporation of Herzlia, Israel. A full technical description of the Scitex SoftProof System is attached hereto as Annex A and is incorporated herein by reference. It will be appreciated by persons skilled in the art that the invention is not limited to use with existing process color graphics editors but is applicable to any suitable apparatus which provides the possibility of selecting the hue, saturation and luminance of colors.

Figure 3:
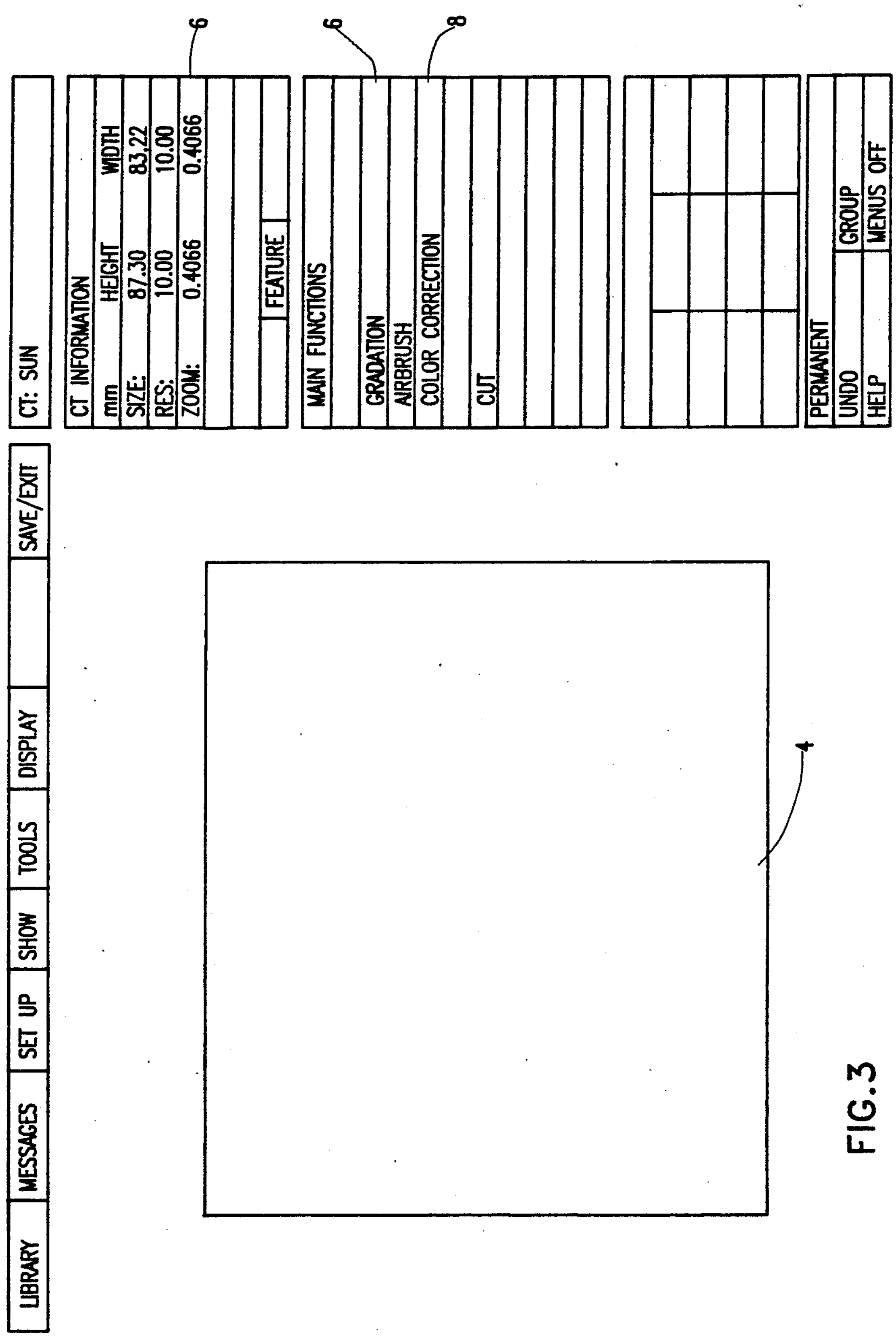
FIG. 3 is a pictorial illustration of a display for image improvement.

The present invention is accessed, in the Scitex SoftProof System, by initially displaying an image. As shown in FIG. 3 and according to page 3 of Annex A, an image 4 is displayed on a screen and options 6 for changing it are displayed to its side. The user then chooses color correction 8, by which at least one of the colors of the image will be corrected according to the teachings of the present invention.

Figure 1:
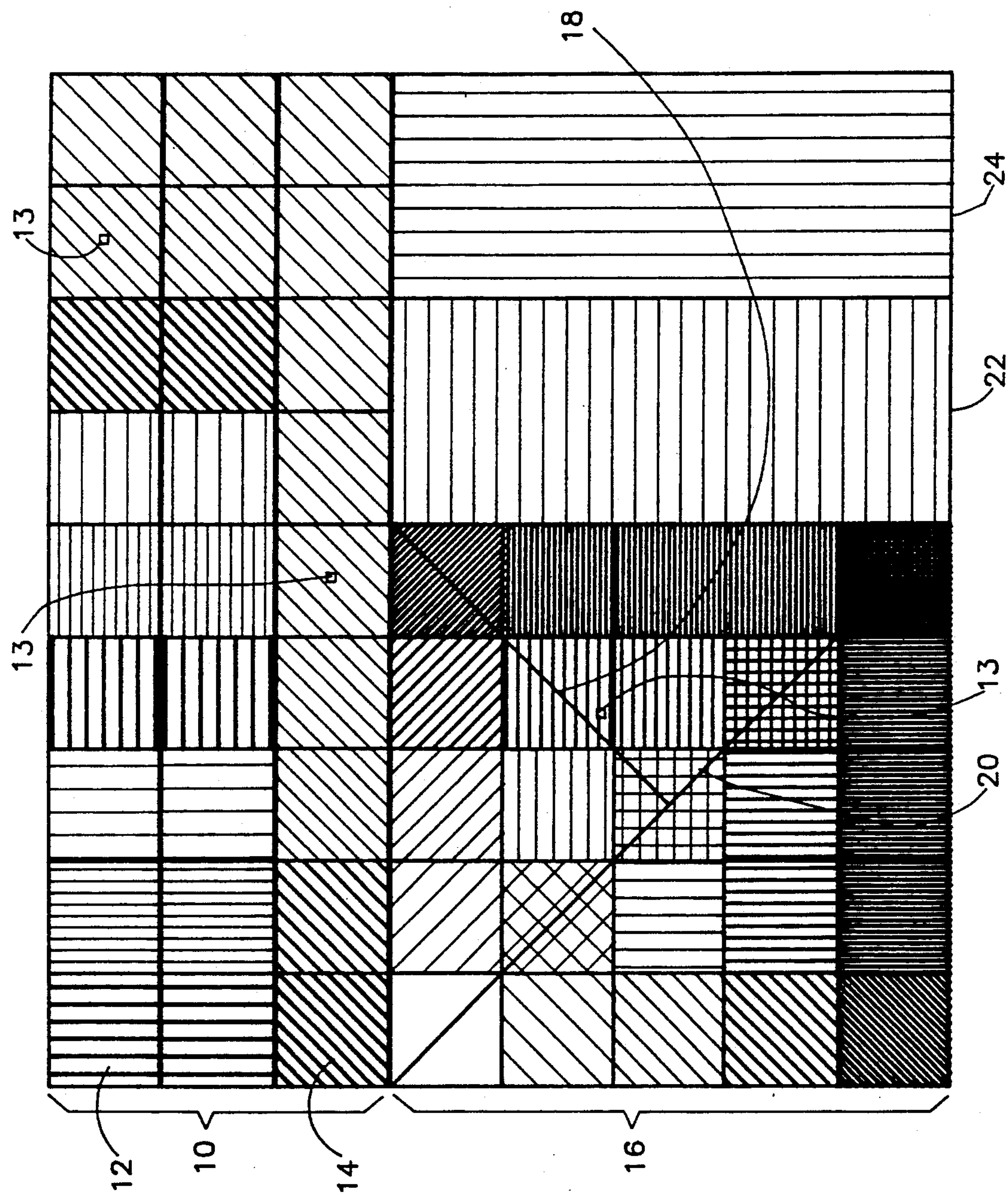
FIG. 1 is an illustration of a color display and selection space provided in accordance with a preferred embodiment of the present invention.
Figures 4A, 4B:
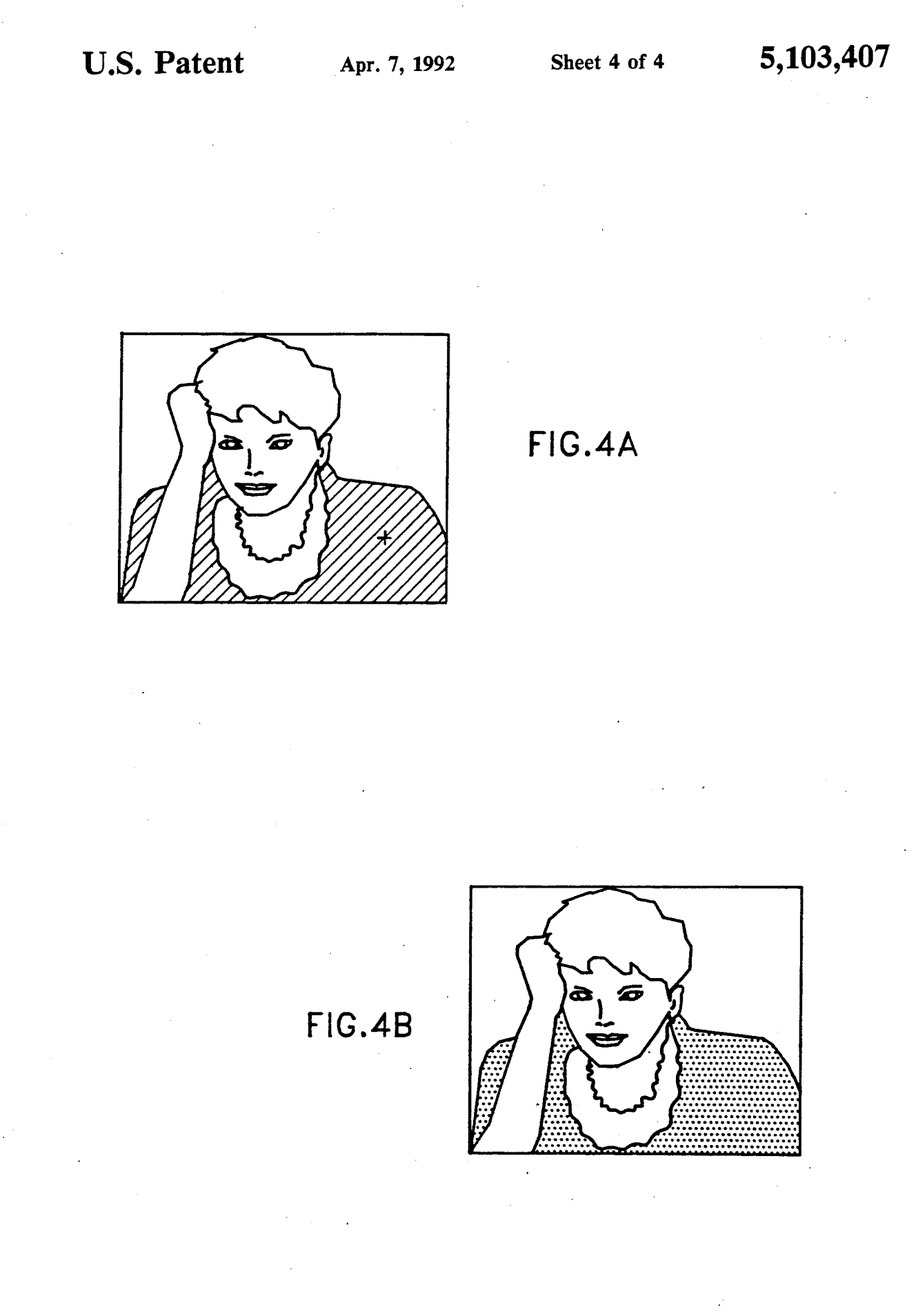

The color correction begins by choosing a reference color from the image, as shown in FIG. 4A and on page 3-19 of Annex A. The user corrects the reference color according to the teachings of the present invention rather than according to those of the Annex A and the corrected color and its neighboring colors in the color space of the image will be reapplied to the image, in a manner similar to that shown in FIG. 4B and on page 3-19 of Annex A. Reference is noe made to FIG. 1, which illustrates a color display and selection space in accordance with a preferred embodiment of the invention. The color space comprises a first area, indicated generally by reference numeral 10, which displays colors having different hues. The first area 10 is divided into a low resolution area 12 and a high resolution area 14. According to a preferred embodiment of the invention, area 12 displays a complete range of colors from red through blue back to red and again to blue, thus displaying each hue with its neighbors on both sides. Area 14 displays to high resolution colors in a predetermined range about a hue selected in the image 4 displayed on the screen or in the low resolution area 12.

The selected hue is marked, typically by a square 13, on both areas 12 and 14. It should be noted that areas 12 and 14 are one dimensional grids.

In accordance with a preferred embodiment of the present invention, the color space also comprises a second area, defining a two-dimensional grid, indicated generally by reference numeral 16, which displays colors having a hue selected in either of the two areas 12 and 14 of first area 10 but with differing saturation and luminance. For the purposes of this description, saturation and luminance are the two axes of the two-dimensional grid and only roughly correspond to the accepted notions of the meanings of the two words.

According to a preferred embodiment of the invention variations in saturation and luminance between color blocks are indicated along respective perpendicular diagonal axes. Axis 18 is the axis of variation of luminance, the highest luminance being indicated in the top left hand corner of area 16 and the lowest luminance being indicated in the bottom right hand corner of area 16. Axis 20 is the axis of variation of saturation, the highest saturation being indicated in the top right hand and bottom left hand corners of area 16, and the lowest saturation being indicated along the axis 18. It will be appreciated that the selection of a color from the two-dimensional grid involves selecting from a palette of colors, all having the same hue and arranged with slow variations from a particular color to its neighboring colors. The colors are arranged between a line of grays, ranging from white to black, along axis 20 and a point opposite that line, having the brightest most saturated color, marking axis 18. The user is not required to distinguish between the luminance and saturation attributes; he merely chooses a color from the two-dimensional grid appropriate to his needs.

The color chosen, a combination of the hue, saturation and luminance levels chosen, is displayed in area 22. As the user changes the hue or saturation and luminance levels, the color displayed in area 22 will change. In area 24, a reference color, a color the user desires to change, typically selected from an image, is displayed and does not change as the user chooses new hue, saturation and luminance levels.

It will also be appreciated that for the purpose of the display only, the colors displayed in areas 10 and 16 are displayed in discrete increments in color blocks of a predetermined size. The color of each color block is that of the central color of the colors in its neighborhood of the whole color range. For example, in area 12, the full color range is typically divided into 20 blocks where each block represents a range of hues. The hue displayed is the central hue of the range. However, the selection of hues covers the entirety of the range of available hues and the location of marker 13, within the color block, defines which of the hues represented therein is selected. For a color block in area 16 the color displayed has the median saturation and luminance levels for the range represented by the block.

It may be appreciated that the color space of FIG. 1 permits display and actual selection of $256\times256\times256$ different colors.

Figure 2:
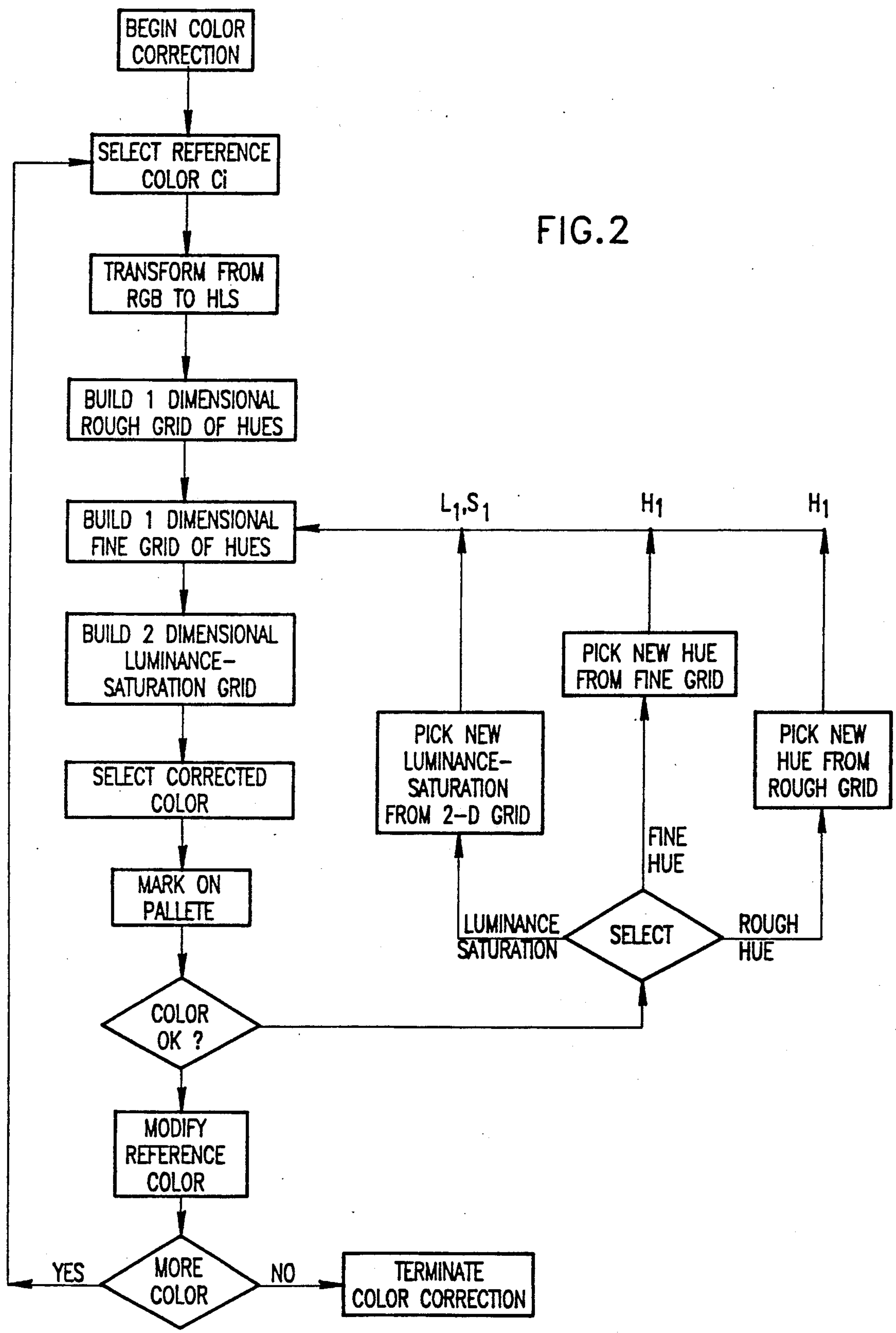
FIG. 2 is a flow chart illustrating a color selection method operative in accordance with the present invention.

Reference is now made to FIG. 2, which is a flow chart illustration of the color selection method of the present invention. The method starts with selection and subsequent display in areas 22 and 24 of the color space of FIG. 1 of a color $C_i$, typically from an image. Typically, the color is expressed in RGB values which are transformed to hue, luminance and saturation values, $H_i$, $L_i$ and $S_i$, via a fast but not necessarily accurate algorithm. As noted before, the hue, luminance and saturation displayed by the color selection method of the present invention are approximations to the scientific definitions of the terms hue, luminance and saturation. It is known in the art that it is difficult to completely separate luminance and saturation and, since the two color axes are displayed together in the present invention, an approximation of their values is acceptable.

In the low resolution space 12, a full range of hues is displayed all having a given luminance and saturation, such as $L=0.5$ and $S=1$. The location of color $C_i$ in area 12 is marked by marker 13.

The selected hue $H_i$ is centrally displayed in high resolution color space area 14 along with a range of hues in the neighborhood of $H_i$ which provide a large selection space. For a complete range of colors defined by a 360° color wheel, a typical range might be from $H_i+30°$ to $H_i-30°$. Marker 13 is placed at the location of hue $H_i$, indicating the selected hue. It should be noted that the selected hue is typically centrally placed in area 14 and that the speed of color shifting depends on the distance between a color newly selected in area 14 and a previously selected color.

The given hue $H_i$, displayed in the high resolution space 12, is displayed and marked in two dimensional saturation luminance color space area 16 along with a full range of colors having different combinations of luminance and saturation. An alternative embodiment includes a second high resolution two dimensional saturation in luminance space which comprises four color blocks of the first low resolution two dimensional space. The four blocks are the block with the point in it, one block above it and two blocks to either the left or right of it.

The user corrects the reference color $C_i$ thus marked as follows. The user selects a desired hue $H_1$ from the either of hue spaces 12 or 14 and the resultant color, having hue, luminance and saturation levels $H_1$, $L_i$ and $S_i$, is displayed in area 22. The location of $H_1$ is marked in areas 12 and 14 and the display of area 20 is updated such that $H_1$ is the base hue. The luminance and saturation levels do not change.

The operator then selects a desired combination of saturation and luminance from the color space area 16 by marking the appropriate location of area 20. The resultant color is displayed in area 22.

A hue range including the selected hue is now displayed in area 14 at the selected luminance-saturation levels. It is appreciated that at any given time, the operator has displayed before him colors that differ from his selected color mainly in hue, with marginal luminance and saturation variations, and colors that differ from his selected color just in their luminance and saturation. At this stage the operator may go back and change the hue selection, while maintaining the saturation-luminance selection. Alternatively, after changing the hue selection, the operator can go back and change the saturation-luminance selection.

The method described hereinabove can be utilized to select two associated colors as follows. A first reference color is selected from image 4 and displayed in a display similar to that of FIG. 1. A second, associated, reference color is selected and displayed as a background color typically in an area around each color block of each of areas 10, 16, 22 and 24. The background color can be automatically selected either by integrating the color of an area about the selection point in image 4 from which the first reference color was selected or by supplying a neutral gray background at the luminance level corresponding to that of the area in image 4 about the selection point. Otherwise, the background color can be selected in a manner similar to that used to select the first reference color.

A new hue value is selected for the first color from the first area and the colors related to the new hue, with varying saturation and luminance values, are displayed in the second area. A color, with new saturation-luminance values, is chosen from the second area. The selecting continues until hue and saturation-luminance values are selected that match the second background color in some way pleasing to the eye of the user. It will be noted that either color can serve as the background color at any time during the selection process.

The method of the present invention is incorporated into the Scitex SoftProof System as an additional feature of the color correction function. Upon choosing color correction, the user is presented with a choice of the previous method, choosing RGB values, or of the method of the present invention. When the user selects the method of the present invention, the Scitex SoftProof System follows the flowchart of FIG. 2 according to the program listing attached hereto as Annex B and incorporated herein by reference.

It will be appreciated by persons skilled in the art that the present invention is not limited by what has been particularly shown and described hereinabove. Rather the scope of the present invention is defined only by the claims which follow:

I claim:

1. Apparatus for color selection comprising:

color display means providing a color selection space including a first area in which colors of a range of different hues are displayed at generally uniform levels of luminance and saturation and a second area in which colors of a given hue, selectable from said range of different hues and of differing saturation and luminance are displayed; and operator controlled computerized color selection means for uniquely determining a desired color in respect of hue, luminance and saturation including:

hue selection means enabling an operator to select a hue for display in the second area from among the hues displayed in the first area; and saturation and luminance selection means enabling an operator to select saturation and luminance of the hue from the saturation and luminance displayed in the second area.

2. Apparatus according to claim 1 and wherein in said first area said colors are displayed in at least one one-dimensional grid.

3. Apparatus according to claim 2 and wherein said at least one one-dimensional grid is operative to display said colors at a relatively low resolution and at uniform levels of luminance and saturation.

4. Apparatus according to claim 2 and wherein said at least one one-dimensional grid is operative to display said colors covering the full available range of hues.

5. Apparatus according to claim 3 and wherein said at least one one-dimensional grid is operative to display said colors covering the full available range of hues.

6. Apparatus according to claim 2 and wherein said at least one one-dimensional grid comprises a plurality of one-dimensional grids including also a one-dimensional grid which displays at relatively high resolution a relatively limited range of hues about a selected hue generally at selected levels of luminance and saturation.

7. Apparatus according to claim 3 and wherein said at least one one-dimensional grid comprises a plurality of one-dimensional grids including also a one-dimensional grid which displays at relatively high resolution a relatively limited range of hues about a selected hue generally at selected levels of luminance and saturation.

8. Apparatus according to claim 4 and wherein said at least one one-dimensional grid comprises a plurality of one-dimensional grids including also a one-dimensional grid which displays at relatively high resolution a relatively limited range of hues about a selected hue generally at selected levels of luminance and saturation.

9. Apparatus according to claim 1 and wherein in said second area said colors are displayed in a two-dimensional grid.

10. Apparatus according to claim 1 and wherein in said second area, variations in saturation and luminance are displayed along mutually orthogonal axes.

11. Apparatus according to claim 1 and wherein in said first and second areas, colors are displayed in color blocks and wherein the color of each color block is a central color of a range of colors represented by said color block.

12. Apparatus according to claim 11 and wherein the selection location of a color within a color block defines which color of said range of colors is selected.

13. Apparatus according to claim 1 and also comprising means for selection of a pair of colors, a first color constituting a constant reference for a second selectable color displayed in said first and second areas.

14. Apparatus according to claim 1 and also comprising areas for the display of a reference color and a selected color said reference color being selected from an image on the screen and said selected color being the color to replace said reference color.

15. A color selection method comprising the steps of:

defining using a computer a color display and selection space including a first area in which colors of a range of different hues are displayed and a second area in which colors of a given hue, selectable from said range of different hues, and of differing luminance and saturation are displayed;

iteration using a computer in any order of the following mutually independent operations:

a. for given luminance-saturation levels, selecting a given hue from the first area; and b. for a given hue, selecting a color of given luminance and saturation from the second area.

16. A method for selection of two associated colors comprising the steps of:

defining using a computer a color display and selection space including a first area in which first colors of a range of different hues are displayed against the background of a second reference color and a second area in which first colors of a given hue, selectable from said range of different hues, and of differing luminance and saturation are displayed against the background of said second reference color;

selecting a reference color using a computer;

varying, by using a computer, said first color iteratively in any order of the following mutually independent operations:

a. for given luminance-saturation levels, selecting a given hue from the first area; and b. for a given hue, selecting a color of given luminance and saturation from the second area.

17. A method according to claim 16 and also comprising the steps of interchanging the first and second colors.

18. A color selection method comprising the steps of:

providing apparatus for color selection comprising:

color display means providing a color selection space including a first area in which colors of a range of different hues are displayed at generally uniform levels of luminance and saturation and a second area in which colors of a given hue, selectable from said range of different hues and of differing saturation and luminance are displayed; and operator controlled computerized color selection means for uniquely determining a desired color in respect of hue, luminance and saturation including:

hue selection means enabling an operator to select a hue for display in the second area from among the hues displayed in the first area; and saturation and luminance selection means enabling an operator to select saturation and luminance of the hue from the saturation and luminance displayed in the second area; selecting a reference color by using a computer; and iterating using a computer in any order of the following mutually independent operations:

a. for given luminance-saturation levels, selecting a given hue from the first area; and b. for a given hue, selecting a color of given luminance and saturation from the second area.

19. A method for selection of two associated colors comprising the steps of:

providing apparatus for color selection comprising:

color display means providing a color selection space including a first area in which colors of a range of different hues are displayed at generally uniform levels of luminance and saturation and a second area in which colors of a given hue, selectable from said range of different hues and of differing saturation and luminance are displayed; and operator controlled computerized color selection means for uniquely determining a desired color in respect of hue, luminance and saturation including:

hue selection means enabling an operator to select a hue for display in the second area from among the hues displayed in the first area; and saturation and luminance selection means enabling an operator to select saturation and luminance of the hue from the saturation and luminance displayed in the second area;

selecting a reference color using a computer;

varying, by using a computer, said first color iteratively in any order of the following mutually independent operations:

a. for given luminance-saturation levels, selecting a given hue from the first area; and b. for a given hue, selecting a color of given luminance and saturation from the second area.

* * * * *